(12) United States Patent
Franz et al.

(10) Patent No.: US 7,889,354 B2
(45) Date of Patent: Feb. 15, 2011

(54) INTERFEROMETRIC MEASURING DEVICE

(75) Inventors: Stefan Franz, Jena (DE); Matthias Fleischer, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 368 days.

(21) Appl. No.: 12/067,501

(22) PCT Filed: Sep. 15, 2006

(86) PCT No.: PCT/EP2006/066398

§ 371 (c)(1),
(2), (4) Date: Aug. 4, 2008

(87) PCT Pub. No.: WO2007/036442

PCT Pub. Date: Apr. 5, 2007

(65) Prior Publication Data

US 2009/0033943 A1    Feb. 5, 2009

(30) Foreign Application Priority Data

Sep. 29, 2005   (DE) .................. 10 2005 046 605

(51) Int. Cl.
*G01B 11/02* (2006.01)
(52) U.S. Cl. .................................. 356/498; 356/497
(58) Field of Classification Search .................. 356/479, 356/482, 497, 498
See application file for complete search history.

(56) References Cited

U.S. PATENT DOCUMENTS 4,385,835 A * 5/1983 Westerberg .................. 356/498

(Continued)

FOREIGN PATENT DOCUMENTS

DE           44 04 663         8/1995

(Continued)

OTHER PUBLICATIONS

Meggitt et al., "An All Fibre White Light Interferometric Strain Measurement System." Sensors and Actuators A, Elsevier Sequoia S.A., Lausanne, CH, vol. 79, No. 1, Jan. 2000, pp. 1 to 7, XP004185118, ISSN: 0924-4247.

(Continued)

*Primary Examiner*—Patrick J Connolly
(74) *Attorney, Agent, or Firm*—Kenyon & Kenyon LLP

(57) ABSTRACT

A device for an interferometric measuring device having a first interferometer and a second interferometer, short coherent radiation being supplied to the first interferometer via a radiation source which is split into to beam components by a first beam splitter; and the optical path length in a beam component being longer than in the other beam component to the effect that the optical path difference is greater than the coherence length of the radiation; before emerging from the first interferometer, the two beam components being recombined and supplied to the second interferometer, which splits the radiation into two additional beam components; the optical path lengths of the two beam components being different to the effect that the optical path difference registered in the first interferometer is balanced again; the optical path length for the respective beam component in the first and the second interferometer being able to be set by at least one movable optical component, and the movable optical components are coupled to each other mechanically. A method for balancing an optical path difference in such an interferometric measuring device, the optical path differences between the beam components being changed in the two interferometers by mechanically coupled movable optical components at the same time and by the same absolute amount. By doing this, path differences in the beam components of the interferometers are able to be varied in one working step, the conditions for the formation of interference being complied with.

13 Claims, 3 Drawing Sheets

U.S. PATENT DOCUMENTS

| | | | | |
|---|---|---|---|---|
| 4,870,635 | A * | 9/1989 | Block et al. | 720/659 |
| 5,402,230 | A * | 3/1995 | Tian et al. | 356/482 |
| 5,549,114 | A * | 8/1996 | Petersen et al. | 600/504 |
| 5,585,922 | A * | 12/1996 | Sueyoshi | 356/487 |
| 6,008,902 | A * | 12/1999 | Rinn | 356/486 |
| 6,020,963 | A * | 2/2000 | DiMarzio | 356/491 |
| 6,724,485 | B1 | 4/2004 | Drabarek | |
| 6,943,894 | B2 * | 9/2005 | Kitahara | 356/487 |
| 7,486,405 | B2 * | 2/2009 | Hogan | 356/497 |
| 7,545,506 | B2 * | 6/2009 | Franz et al. | 356/498 |
| 7,649,630 | B2 * | 1/2010 | Hogan | 356/497 |
| 2002/0109849 | A1 * | 8/2002 | Kitahara et al. | 356/486 |
| 2004/0036887 | A1 * | 2/2004 | Kitahara | 356/486 |
| 2006/0238771 | A1 | 10/2006 | Drabarek et al. | |
| 2007/0046949 | A1 * | 3/2007 | Heiden et al. | 356/498 |
| 2007/0252999 | A1 * | 11/2007 | Hogan | 356/450 |
| 2009/0033943 | A1 * | 2/2009 | Franz et al. | 356/479 |
| 2010/0002241 | A1 * | 1/2010 | Hirose | 356/497 |

FOREIGN PATENT DOCUMENTS

| | | |
|---|---|---|
| DE | 198 08 273 | 9/1999 |
| DE | 102 44 553 | 2/2004 |
| JP | 64-12206 | 1/1989 |
| JP | 7-198320 | 8/1995 |
| JP | 8-271219 | 10/1996 |
| JP | 2003-121795 | 4/2003 |
| JP | 2003-202203 | 7/2003 |

OTHER PUBLICATIONS

International Search Report, PCT International Patent Application No. PCT/EP2006/066398, dated Nov. 13, 2006.

* cited by examiner

INTERFEROMETRIC MEASURING DEVICE

FIELD OF THE INVENTION

The present invention relates to a device for an interferometric measuring device, e.g., having a first interferometer and a second interferometer, short coherent radiation being supplied to the first interferometer via a radiation source which is split into two beam components by a first beam splitter; and the optical path length in a beam component being longer than in the other beam component to the effect that the optical path difference is greater than the coherence length of the radiation; before emerging from the first interferometer, the two beam components being reunited and supplied to the second interferometer, which splits the radiation into two additional beam components; the optical path lengths of the two beam components being different to the effect that the optical path difference registered in the first interferometer is balanced again.

The present invention also relates to a method for balancing the optical path difference in an interferometric measuring device, e.g., using two successive interferometers, short coherent radiation being supplied to the first interferometer via a radiation source which is split up into two beam components via a first beam splitter, of which one beam component traverses a greater optical path length than the other beam component to the effect that the optical path difference between the beam components is greater than the coherence length of the radiation, before emerging from the first interferometer, the two beam components being reunited and supplied to the second interferometer, which splits the radiation into two additional beam components; the optical path lengths of the two beam components being different to the effect that the optical path difference registered in the first interferometer is balanced again.

BACKGROUND INFORMATION

German Published Patent Application No. 102 44 553 describes an interferometric measuring device for recording the shape, the roughness or the distance of the surface of a measuring object, using a modulation interferometer to which short-coherent radiation is supplied by a radiation source and which has a first beam splitter for splitting the radiation supplied into a first beam component guided via a first arm, and into a second beam component guided via a second arm, of which the one is shifted with respect to the other with the aid of a modulating device in its light phase or light frequency, and passes through a lag line, and which are subsequently are united at an additional beam splitter of the modulation interferometer, having a measuring probe that is spatially separated from the modulating interferometer and is coupled to it or is able to be coupled to it via a light-conducting fiber set-up, in which the combined beam components are split into a measuring beam guided to the surface by a probe-optical fiber unit having a slantwise exit area on the object side and a reference beam, and in which the measuring beam ($r_1(t)$) reflected at the surface and the reference beam ($r_2(t)$) reflected at a reference plane are superposed, and having a receiver device and an evaluating unit for converting the radiation supplied to it into electrical signals and for evaluating the signals on the basis of a phase difference. In this context, the angle of inclination (y) of the exit surface to the normal of the optical probe axis amounts to at least 46°.

German Published Patent Application No. 198 08 273 also describes such an interferometric measuring device for recording the shape or the distance, especially of rough surfaces, using at least one spatially coherent beam generation unit, whose radiation is split up in a measuring probe into reference measuring beam guided through a measuring reference arm and reflected in it and into a measuring beam guided through a measuring arm and reflected at the rough surface, and having a device for modulating the light phase or for shifting the light frequency (heterodyne frequency) of a first beam component with respect to the light phase or the light frequency of a second beam component using a superposition unit for superposing the reflected measuring reference beam by the reflected measuring beam, having a beam decomposition unit and a beam receiving unit for splitting up the superposed radiation into at least two beams having different wavelengths and converting the radiation into electrical signals and having an evaluation device in which the shape and the distance of the rough surface is determinable based on a phase difference of the electrical signals. In this context, the radiation emitted by the radiation generating unit is temporally short coherent and broad-banded.

Such interferometric measuring devices, made up first of all of two interferometers may be constructed using different interferometer types. Thus, a modulation interferometer may be constructed as a Mach-Zehnder interferometer, while the measuring interferometer or the measuring probe is constructed compactly, for instance, as a Mirau interferometer. It is common to the two interferometric measuring devices that a path difference between two beam components registered in the first interferometer is balanced again in the second measuring interferometer or measuring probe by a short coherent radiation source, thus bringing the beam components to the formation of interference. The path difference registered by a delay element in German Published Patent Application No. 198 08 273 is also able to be generated, in this instance, by sub-arms of different lengths which are traversed by the beam components, as is shown in German Published Patent Application No. 198 08 273, in a modulation interferometer constructed using fiber optic guides.

In order to improve the measuring accuracy of the interferometric measuring device, it is known that one may connect a second output of the modulation interferometer to a reference interferometer. It is optically constructed in the same manner as the measuring interferometer, that is, it balances again the path difference between the two beam components registered in the modulation interferometer. The constructive design of the reference interferometer, however, differs from that of the measuring interferometer. The measuring accuracy of the interferometric measuring device may be improved by the comparison of the signals of the reference interferometer to those of the measuring interferometer.

The path difference that is to be registered in the modulation interferometer depends on the constructive execution of the measuring interferometer or the measuring probe. After a change in the measuring interferometer or the measuring probe, the path difference accordingly has to be correspondingly adjusted in the modulation interferometer. This generally takes place in a motorized manner, by shifting optical components.

In the reference interferometer the path difference also has to be adjusted correspondingly. In this instance, it is usual to adjust the path difference by substituting a preadjusted unit. The disadvantage of doing this is that adjusted units have to be available that correspond to the measuring interferometer being used. At the same time, the exchange of the units is costly.

SUMMARY

Example embodiments of the present invention provide a device for an interferometric measuring device, which makes possible a simple adjustment of the registered path differences between beam components of optically coupled interferometers.

Example embodiments of the present invention provide a method for this.

According to example embodiments of the present invention, it is provided that the optical path length for the respective beam component in the first and the second interferometer is able to be set by at least one movable optical component, and that the movable optical components are coupled to each another mechanically. Because of the mechanical coupling, a change in the optical path length in one interferometer is simultaneously also carried out in the other interferometer. Consequently, no separate adjustment is required of the path difference in the interferometers, nor an exchange in the optical unit, but rather, the adjustment takes place in one work step.

A suitable adjustment of the path differences in the two interferometers is attained in that the sign of the change of the optical path lengths in the two beam components of the first and the second interferometer is equal or opposite and/or that the absolute amount of the change of the optical path lengths in the two beam components is equal. Since the two beam components at the output of the first interferometer are combined, and at the beginning of the second interferometer are again split into two beam components, in both beam components of the second interferometer there exists a radiation component both of the non-delayed and also of the delayed beam component from the first interferometer. A minimization of the optical path length of one of the beam components in the second interferometer thus has the same effect on the temporal sequence of the radiation components as an extension of the optical path length in the other beam component. Consequently, a superposition of the respective radiation components may be brought about and the beam components may be brought to interference, both by an equidirectional and an opposite change in the optical path lengths in the respective beam components of the first and the second interferometer.

The mechanical coupling of the movable optical components of the two interferometers is able to be achieved by mounting the movable optical components onto a common movable carrier.

In example embodiments of the present invention, the movable optical components are designed as plane mirrors, as triple corner mirrors or as coupling elements for light conducting elements. These component elements are also used in the interferometric measuring devices of the type described, that are customary these days, without the mechanical coupling according to example embodiments of the present invention.

The mechanical coupling of the movable optical components is able to be achieved by integrating the movable optical components of the two interferometers in one movable optical component. This makes possible a very compact and cost-effective design of the interferometer, a probing, low in errors, of the movable optical components in the beam components of the two interferometers being assured.

The combination of the two movable optical components into an integrated optical component may be achieved by designing the integrated optical component as a triple prism having one ray entry for the first interferometer and one ray entry for the second interferometer, as well as one emergence for the first interferometer and one beam emergence for the second interferometer. This execution is suitable in the case of two interferometers in which the rays incident on the integrated optical component and the emerging rays extend separately, as is known, for instance, in the case of Mach-Zehnder interferometers. What is advantageous in this execution based on a triple prism is the simple alignment of the component in the optical paths of the two interferometers, based on the error tolerance in the beam control inn the case of triple prism. Furthermore, the optical path lengths in the two optical paths may be held to be equal when passing through the triple prism.

A further possibility of integrating the two movable optical components into one optical component is to design the integrated optical component as a triple prism having a mirrored surface from area to area, on the entry side, a beam component of one interferometer having separate beam paths being folded via a beam entry and a beam emergence by a triple prism, and a beam component of the other interferometer being folded having superposed beam paths at the mirrored surface. Accordingly, this design is suitable for interferometric measuring devices in which, in an interferometer, the beam incident on the movable optical component and the emerging beam are running separately, while in the other interferometer, the beam incident on the optical component and the emerging beam are superposed, which is usual, for instance, in a Michelson interferometer.

A simple and accurate balancing of the path differences may be achieved by providing a manually driven or a motor-driven linear drive for shifting the movable optical component. The motor-driven drive, in this instance, may particularly be a part of an automated measuring device, in which the balancing of the path differences is performed by an electronic control unit.

A very broadly diversified field of application of example embodiments of the present invention for the most varied optically coupled interferometer may be achieved by having the beam coupling into the interferometric measuring device, the optical connection between the two interferometers and/or the relay of the emergent beams take place using a fiber optic guide or an optical free beam.

If the movable optical components of the two interferometers are not able to be mechanically coupled to each other, based on structural conditions, for instance, because of a common movable carrier, then a simultaneous and similar change in the optical path lengths is able to be achieved in the respective sub-arms by providing separately movable optical components in both interferometers, for setting the optical path differences between the beam components, and the coupling of the movement of the optical components is executed electronically via the similar control of electrical drive elements.

In an example embodiment of the present invention, the first interferometer represents a modulation interferometer, whereas the second interferometer forms a reference interferometer or a reference probe or a reference measuring point. The reference interferometer, the reference probe or the reference measuring point is connected at an exit of the modulation interferometer, in this instance, whereas at the other exit the modulation interferometer, usually a measuring probe or a measuring interferometer is connected. The measuring probe or the measuring interferometer may be connected, e.g., in a known manner, to the modulation interferometer as a compact component unit, for instance, flexibly via a fiber optic guide, and used for determining surface roughnesses. If a change of the measuring probe or the measuring interferometer makes necessary a balancing of the path differences in the modulation interferometer and the reference probe or the reference interferometer or the reference probe, this may be accomplished in one step, without great effort, by shifting the mechanically coupled optical components.

Example embodiments of the present invention relating to the method provide that the optical path differences between the beam components in the two interferometers being changed by mechanically coupled, movable optical components simultaneously and by the same absolute amount. Thus, the balancing of the registered path differences between the beam components takes place synchronously by changing the optical path lengths in the two variable beam components of the two interferometers. If, for example, the change of a third interferometer coupled optically to the first interferometer makes balancing of the path differences in the first and the second interferometer necessary, this is done in one work step, without the exchange of optical components being necessary.

The balancing of the optical path differences may be achieved by the change in the optical path length taking place in both beam components in the same or the opposite direction.

Example embodiments of the present invention are explained in greater detail in the following on the basis of the exemplary embodiments illustrated in the figures.

DETAILED DESCRIPTION

Figure 1:
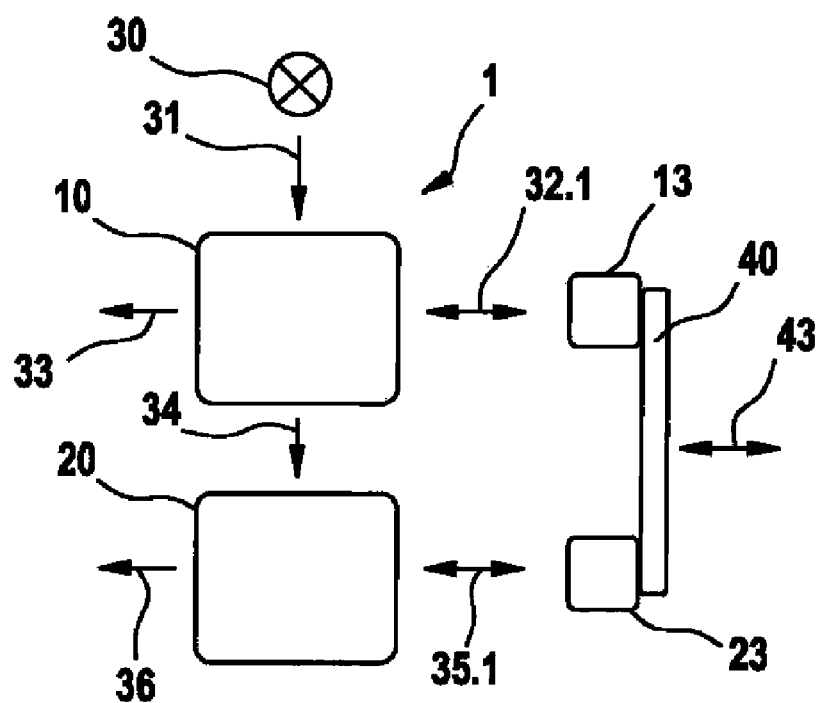
FIG. 1 a schematic representation of an interferometric measuring device having mechanically coupled movable optical components of two interferometers, FIG. 2 an interferometric measuring device having mechanically coupled movable optical components in a Mach-Zehnder interferometer and a Michelson interferometer, FIG. 3 a variant of an interferometric measuring device having mechanically coupled movable optical components in the case of two interferometers FIG. 4 an integrated optical component for mechanically coupled interferometers having separate beam paths, FIG. 5 an integrated optical component for mechanically coupled interferometers having separate and superposed beam paths, FIG. 6 an interferometric measuring device having direct coupling of the beam folding of two interferometers.

FIG. 1 shows an interferometric measuring device 1 in a schematic representation, having a short coherent radiation source 30, a first interferometer 10 and a second interferometer 20, as well as two movable optical components 13, 23 and a carrier 40 that is movable corresponding to direction of motion 43 shown. First interferometer 10 is supplied with short coherent radiation 31 of radiation source 30. In first interferometer 10, the supplied short coherent radiation 31 is split up into two beam components 32.1, 32.2, a beam component 32.1 being supplied to movable optical components 13. Movable optical component 13 is developed as a beam folder for beam component 32.1. Beam component 32.1 returned by movable optical component 13 is superposed again in first interferometer 10 by beam component 32.2 and is supplied to beam emergence 33 and beam transition 34 to second interferometer 20. In second interferometer 20, the radiation supplied via beam transition 34 is split up into two beam components 35.1, 35.2, a beam component 35.1 being supplied to movable optical component 23, which is also developed as a beam folder. Subsequently to movable optical component 23, beam components 35.1 and 35.2 are superposed again in second interferometer 20 and supplied to a beam emergence 36.

The movable optical components 13, 23 are held on common movable carrier 40, and are thus mechanically coupled. A movement of movable carrier 40 according to direction of motion 43 therefore leads to a similar movement of movable optical components 13, 23. Consequently, the optical path length for first beam component 32.1 of first interferometer 10 is changed by the same absolute amount as the optical path length of first beam component 35.1 of second interferometer 20. This leads to an equal change in the optical path differences between beam components 32.2, 35.2 that traverse a fixed optical path, and beam components 32.1, 35.1 that are able to be variably adjusted in their optical path length. If the registered path differences in the two interferometers 10, 20 are at least approximately the same, in response to short coherent radiation 31, this leads to the formation of interference at beam emergence 36 of second interferometer 20. Since the optical path lengths in the two beam components 32.1, 35.1 are similarly adjusted by carrier 40 that is movable in common and optical components 13, 23 that are mechanically coupled by it, the optical path difference in second interferometer 20 continues to correspond to the optical path difference in first interferometer 10, even in response to the shifting of movable optical components 13, 23, so that the condition for the formation of interference is complied with at the exit of second interferometer 20.

Figure 2:
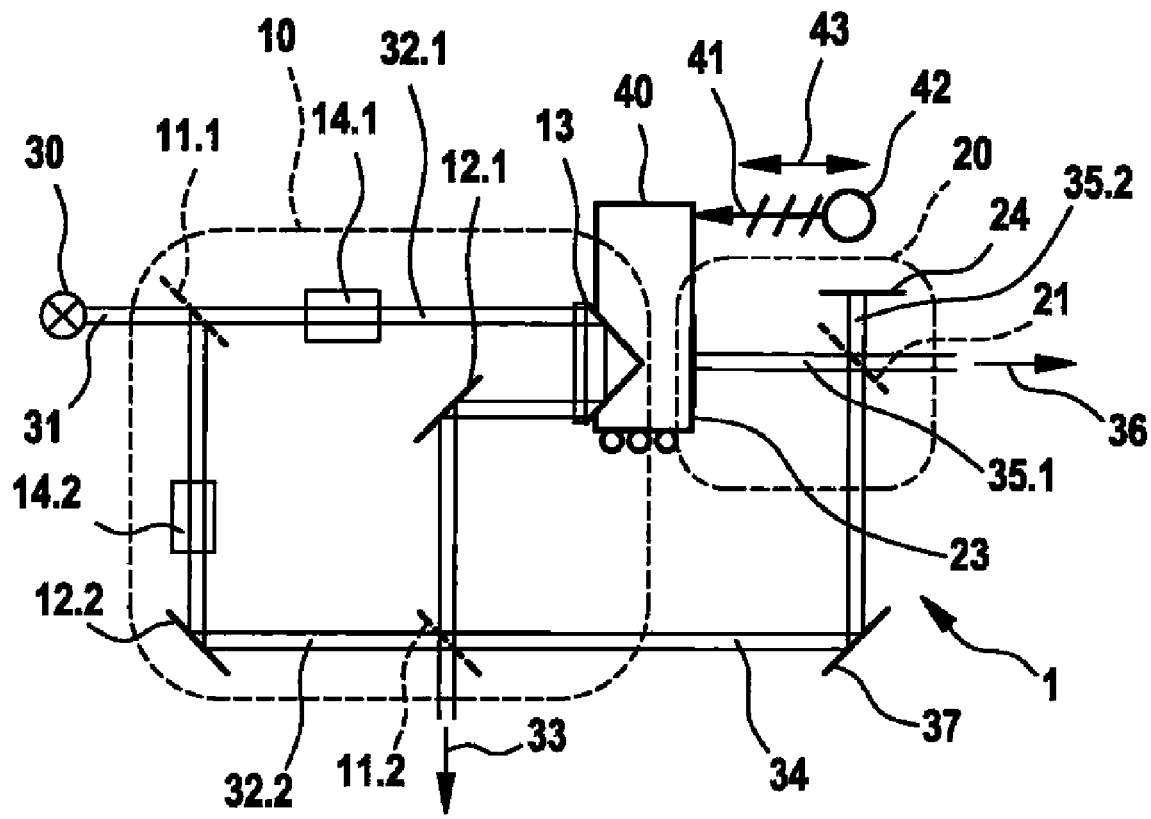

FIG. 2 shows an interferometric measuring device 1 having mechanically coupled movable optical components 13, 23 in an example embodiment having a first interferometer 10 as a modulation interferometer in Mach-Zehnder version and a second interferometer 20 as a reference interferometer in a Michelson version. Here too, short coherent radiation 31 of a spatially coherent but temporally short coherent radiation source 30 is supplied to first interferometer 10. In the Mach-Zehnder arrangement, first interferometer 10 is made up of two beam splitters 11.1, 11.2 and two path-folding mirrors 12.1, 12.2. Incident short coherent radiation 31 is split up by first beam splitter 11.1 into two beam components 32.1, 32.2. Two acoustooptical modulators 14.1, 14.2 are mounted in the beam paths of the two beam components 32.1, 32.2, for the implementation of a modulation interferometer in a known manner.

A movable optical components 13 in the form of a triple prism is mounted in the beam path of first beam component 32.1, which reflects back first beam component 32.1 coming from acoustooptical modulator 14.1 onto path-folding mirror 12.1, and from there to second beam splitter 11.2. After acoustooptical modulator 14.2, second beam component 32.2 is reflected by path-folding mirror 12.2 to second beam splitter 11.2, in which the two beam components 32.1 and 32.2 are superposed and supplied to beam emergence 33 and to beam transition 34.

The radiation from beam transition 34 is supplied to second interferometer 20 via a beam-folding mirror 37. Second interferometer 20, as a Michelson interferometer, is made up of a beam splitter 21, a fixed mirror 24 and a movable optical components 23 in the form of a mirror. The radiation incident from beam transition 34 and mirror 37 is split up in beam splitter 21 into two beam components 35.1, 35.2. Beam component 35.2 is reflected by fixed mirror 24, beam component 35.1 is reflected by movable optical components 23, back to beam splitter 21, and from there, superposed, supplied to beam emergence 36.

Movable optical components 13, 23 are mounted on a common carrier 40, which is connected to motor 42 using a linear drive 41. Motor 42 and linear drive 41 make possible the motion of carrier 40, and with that, also the motion of movable optical components 13, 23 corresponding to direction of motion 43 shown.

Because of a different optical path length in the beam paths of beam components 32.1, 32.2 of first interferometer 10, and conditioned on this the path difference between beam components 32.1, 32.2, the formation of interference does not take place after recombining beam components 32.1, 32.2 in second beam splitter 11.2 in response to short coherent radiation 31 used. The path difference may be varied by shifting carrier 40 and optical component 13 connected to it.

In second interferometer 20, between beam components 35.1 and 35.2, a path length that is about the same as in first interferometer 10 is registered by correspondingly different optical path lengths in the beam paths of the two beam components 35.1 and 35.2. The path difference of first interferometer 10 is balanced thereby, and the two beam components 35.1 and 35.2 are able to interfere after being recombined in beam splitter 21.

Such an interferometric measuring device 1 is usually designed in connection with a measuring interferometer, which is optically coupled to beam emergence 33 of first interferometer 10. This measuring interferometer may be developed compactly, and be connected flexibly, for example, via optical fiber, to interferometer 10, and may thus, for instance, perceive measuring tasks on inaccessible measuring objects. In this measuring interferometer, too, an optical path difference is introduced between its beam components, which balances the path difference registered in first interferometer 10, and thus leads to interference. The path difference in such measuring interferometers is mostly specified in a fixed manner, and varies from measuring interferometer to measuring interferometer. A change in measuring interferometers, as may be necessary for different measuring tasks, therefore requires a balancing of the path difference in modulation interferometer, interferometer 10, and thus also in reference interferometer, interferometer 20.

By shifting common carrier 40 and movable optical components 13, 23 mechanically coupled by it, the path difference between beam components 32.1, 32.2 of first interferometer 10 and the path difference between beam components 35.1, 35.2 of second interferometer 20 are able to be balanced correspondingly to a changed measuring interferometer in one work step. A separate balancing of the path difference in second interferometer 20, that is designed as a reference interferometer, as is necessary these days by exchanging optical components or by an adjustment using a micrometer screw, may thus be omitted.

In this context, the optical path lengths of beam components 32.1, 35.1 are changed by the same absolute amount, but having opposite signs, in the example embodiment shown. The shifting, having opposite signs, of the optical path lengths in beam components 32.1, 35.1 of the two interferometers 10, 20, corresponds, from an optical point of view, to a change in the optical path lengths in the same direction. Since the two beam components 32.1, 32.2 are combined at second beam splitter 11.2 of first interferometer 10, and are split again into two beam components 35.1, 35.2 at beam splitter 21 of second interferometer 20, there is present in both beam components 35.1, 35.2 of second interferometer 20 a radiation component both of the non-delayed and of the delayed beam component 32.1, 32.2 from first interferometer 10. A minimization of the optical path length of one of the two beam components 35.1, 35.2 in second interferometer 20 thus has the same effect on the temporal sequence of the radiation components as an extension of the optical path length in the respectively other beam components 35.1, 35.2. Consequently, a superposition of the respective radiation components may be brought about and beam components 35.1, 35.2 may be brought to interference, both by an equidirectional and an opposite change in the optical path lengths in the respective beam components 32.1, 35.1 of first and second interferometer 10, 20.

Figure 3:
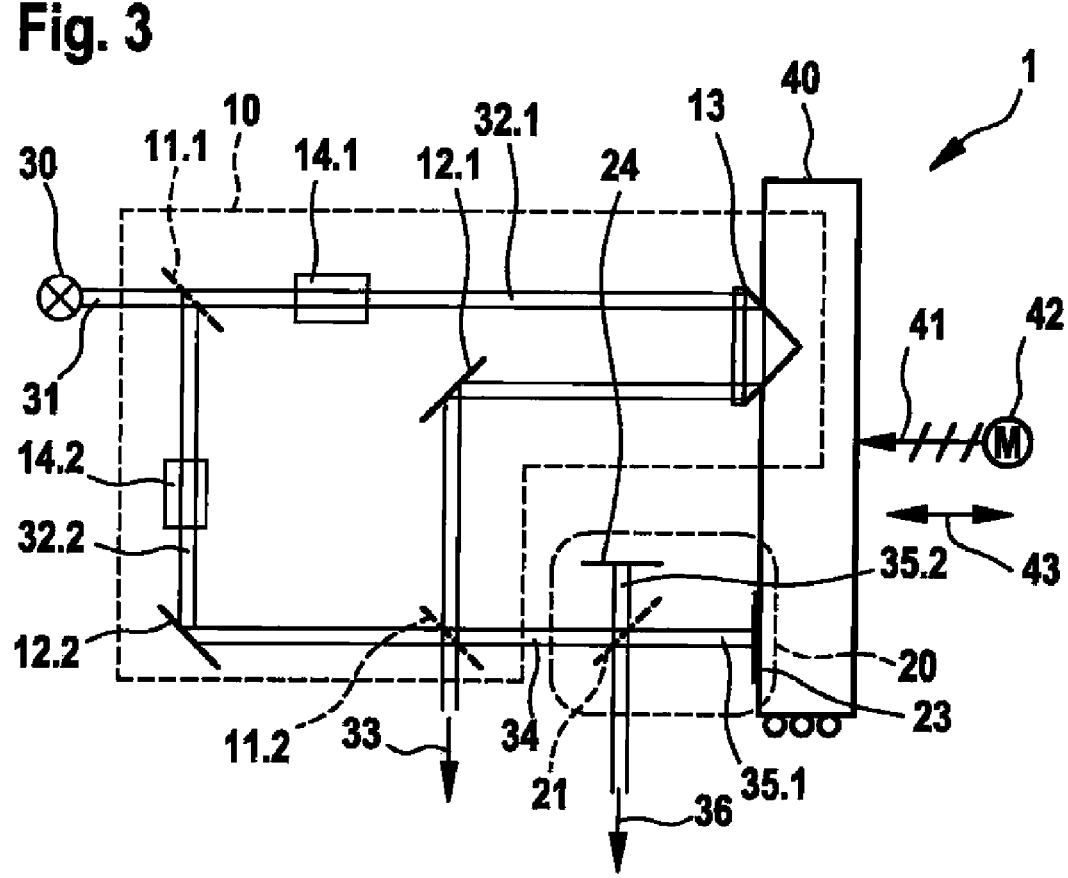

FIG. 3 shows a further variant of an interferometric measuring device 1 having mechanically coupled movable optical components 13, 23 in two optically coupled interferometers 10, 20. First interferometer 10 is developed again, in this instance, as a Mach-Zehnder interferometer as the modulation interferometer, having the components that were described in FIG. 2. Second interferometer 20 is also designed as a Michelson interferometer as described in FIG. 2. Here too, a radiation source 30 provides short coherent radiation 31. By contrast to FIG. 2, radiation transition 34 from first interferometer 10 to second interferometer 20 takes place directly, without deflection by an additional mirror. The movable optical components 13, 23 are situated on a common carrier 40 in such a way that a shifting, introduced via a linear drive 41 and a motor 42, in a manner corresponding to a direction of motion 43, has the effect of an equidirectional shifting of the two movable optical components 13, 23 by the same path length. A path difference registered in first interferometer 10 between beam components 32.1, 32.2 is balanced again in second interferometer 20 by a corresponding path difference between beam components 35.1, 35.2, and the two beam components 35.1, 35.2 are thus brought to interference in beam splitter 21. A change in the path difference between beam components 32.1 and 32.2 and between beam components 35.1 and 35.2, as is made necessary, for example, by the change of a measuring interferometer, not shown here, that is optically coupled to beam emergence 36 of first interferometer 10, may be made in one working step by shifting common carrier 40 and the movable optical components 13, 23 that are mechanically coupled by it.

Because of the mechanical coupling of movable optical components 13, 23 and thus of the path lengths of beam components 32.1, 35.1 it is achieved that the optical path length differences in the two interferometers 10, 20 are equal. Because of this, evaluable interference phenomena will always take place in beam emergence 36 of second interferometer 20.

In the implementation of such an interferometric measuring device 1, the two interferometers 10, 20 are situated spatially in such a way that the movable beam deflections in the form of movable optical components 13, 23 are able to be connected to each other mechanically via common movable carrier 40. The coupling in of radiation 31, the optical connection of interferometers 10, 20 and the relay of the emergent beams from beam emergences 33, 36 of interferometers 10, 20 is able to take place as a free beam or in fiber optic guides. All known methods come into consideration for the movement of movable optical components 13, 23 or rather of common carrier 40.

The advantage of interferometric measuring device 1 shown in FIG. 3 compared to interferometric measuring device 1 shown in FIG. 2 is in the improved efficiency of the beam yield.

Figure 4:
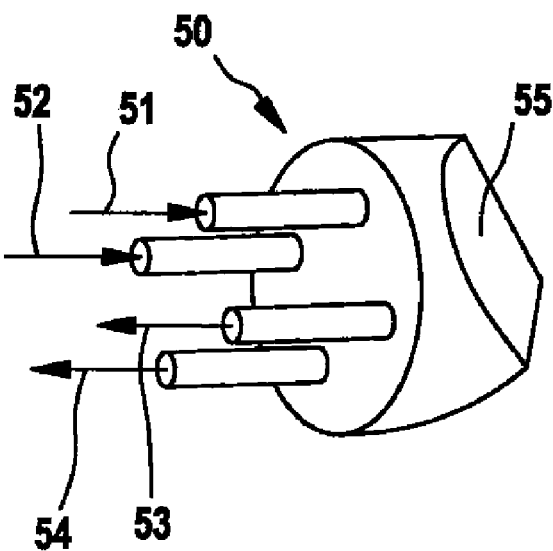

FIG. 4 shows an integrated optical component 50 for mechanically coupled interferometers 10, 20 that are not shown, having separate beam paths. Integrated optical component 50 is designed as a triple prism 55, having in each case one beam entry 51, 52, and in each case one beam emergence 53, 54 for a first and a second interferometer 10, 20. Integrated optical component 50 is developed, in this context, for interferometers 10, 20 having separate beam paths, that is, the incident and the reflected portions of beam components 32.1, 35.1 do not run on one beam line.

Figure 5:
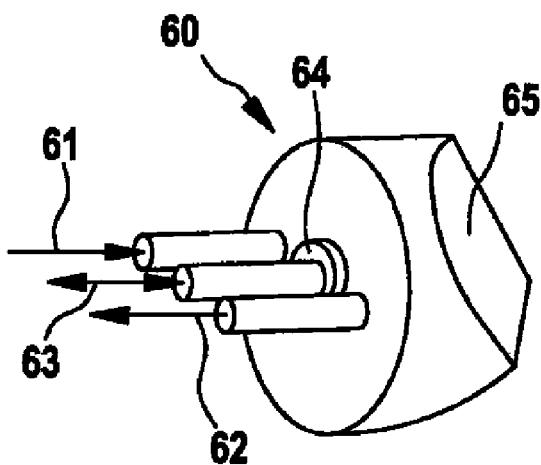

FIG. 5 shows a further variant of an integrated optical component 60 for mechanically coupled interferometers 10, 20, but in this case having separate beam paths that lie one over the other. Integrated optical component 60 is developed as a triple prism having a surface 64 that is mirrored from place to place. For interferometers 10, 20 having the separate beam paths, a beam entry 61 and a beam emergence 62 are available, whereas for interferometers 10, 20 having the beam paths lying one over the other a common beam entry/emergence 63 is provided. A beam component 32.1, 32.2 of an interferometer 10, 20 that is coupled into beam entry 61, and is not shown, is reflected via triple prism 65 to beam emergence 62, whereas a beam component 32.1, 32.2 incident upon common beam entry/emergence 63 is reflected back by mirrored surface 64 into common beam entry/emergence 63.

Integrated optical components 50, 60 shown in FIG. 4 and FIG. 5 unify movable optical components 13, 23 shown in FIGS. 1 to 3 respectively into an optical component 50, 60. The two interferometers 10, 20 that are not shown should be situated so that beam components 32.1, 35.1, that are changeable in their optical path length, are deflected in an integrated optical component 50, 60 used. A shifting of the position of integrated optical component 50, 60 thus leads to an equal optical path change in beam components 32.1, 35.1 and thus to an equidirectional change, and a change that is equal in absolute amount, of the optical path difference in the two interferometers 10, 20.

Figure 6:
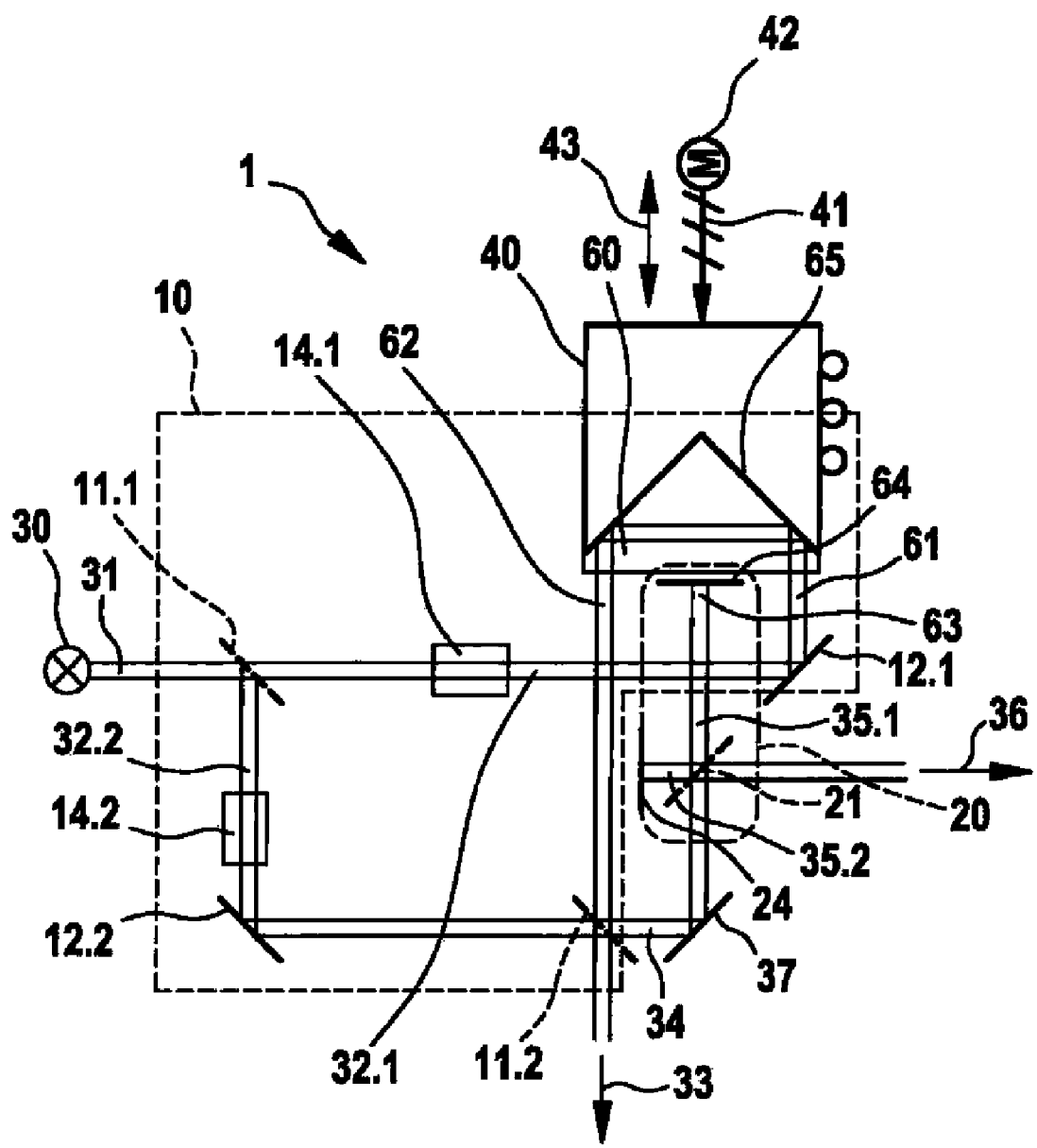

FIG. 6 shows a variant of an interferometric measuring device 1 having direct coupling of the beam folding of two interferometer 10, 20. In this case, interferometer 10, 20 is designed as a Mach-Zehnder interferometer as the modulation interferometer and interferometer 20 is designed as a Michelson interferometer, having the components and beam components already described in FIG. 2. A radiation source 30 delivers short coherent radiation 31, in this instance. The beam folding of the two beam components 32.1, 35.1 of the two interferometer 10, 20, that are variably adjustable in their optical path length, takes place by a movably integrated optical component 60, as is described in FIG. 5. The position of movable integrated optical component 60, that is mounted on a movable carrier 40, is adjustable by a linear drive 41 having a motor 42, corresponding to direction of motion 43 shown.

Beam component 32.1 coming from first beam splitter 11.1 and from acoustooptical modulator 14.1 is conducted by path-folding mirror 12.1 into a beam entry 61 of integrated optical component 60, and is reflected by its triple prism 65 via a beam emergence 62 to second beam splitter 11.2. The beam guidance via triple prism 65 is accordingly a component of first interferometer 10. In beam splitter 11.2, beam component 32.1 is recombined with beam component 32.2 which, however, does not lead to any formation of interference, because of the different optical path lengths of beam components 32.1, 32.2 traversed, and short coherent radiation 31 used. After beam splitter 11.2, recombined beam components 32.1, 32.2 reach a beam emergence 33, to which a measuring interferometer, that is not shown, is able to be connected, and via beam transition 34 and a deflecting mirror 37, they reach second interferometer 20. In second interferometer 20, the incident radiation is split by a beam splitter 21 into two beam component 35.1, 35.2. A beam component 35.2 having a fixed optical path length is reflected back to beam splitter 21 by a fixed mirror 24. The other beam component 35.2 that is variable in its optical path length reaches mirrored surface 64 via common beam entry/emergence 63 of integrated optical component 60, from which it is again reflected via common beam entry/emergence 63 to beam splitter 21. Beam components 35.1, 35.2 are superposed in beam splitter 21. Because of the different optical path lengths, which the two beam component 35.1, 35.2 traverse, the path difference registered in first interferometer 10 is balanced, whereby the two beam components 35.1, 35.2 are able to interfere in beam splitter 21.

A shifting of the position of integrated optical component 60 according to direction of motion 43 changes the optical path length in the two beam components 32.1 and 35.1 in the same direction and by the same absolute amount. A change in the path differences between beam components 32.2, 35.2 having fixed optical path lengths and respective beam components 32.1, 35.1 having variable optical path lengths, as may be necessary in the form described by an exchange of a measuring interferometer that is connected to beam emergence 33, may thus take place in one work step by shifting integrated optical component 60. The mechanical coupling of the movable optical components in the two interferometers 10, 20, in this context, is not implemented by mounting individual movable components 13, 23 on a common carrier 40, as is shown in FIGS. 1, 2 and 3, but by the integration of such movable components 13, 23 into an integrated optical component 60.

What is claimed is:

1. A device for an interferometric measuring device, comprising:

a first interferometer; and
a second interferometer;
wherein short coherent radiation is supplied to the first interferometer via a radiation source which is split into two beam components via a first beam splitter;
wherein an optical path length in a first beam component is longer than in a second beam component to the effect that an optical path difference is greater than a coherence length of the radiation;
wherein before emerging from the first interferometer, the two beam components are recombined and supplied to the second interferometer, which splits the radiation into two additional beam components;
wherein optical path lengths of the two additional beam components are different to the effect that the optical path difference registered in the first interferometer is balanced again;
wherein the optical path length for respectively one beam component is adjustable in the first and the second interferometer by at least one movable optical component; and
wherein the movable optical components are mechanically coupled to one another.

2. The device according to claim 1, wherein at least one of (a) a sign of a change of the optical path lengths is equal or opposite in the two beam components of the first and the second interferometer and (b) an absolute amount of the change of the optical path lengths is the same in the two beam components.

3. The device according to claim 1, wherein the movable optical components are mounted on a common movable carrier.

4. The device according to claim 1, wherein the movable optical components are arranged as at least one of (a) plane reflectors, (b) triple reflectors, and (c) coupling elements for light-conducting elements.

5. The device according to claim 1, wherein the movable optical components of the two interferometers are integrated into an optical component.

6. The device according to claim 5, wherein the integrated optical component is arranged as a triple prism having a beam entry for the first interferometer and a beam entry for the second interferometer, as well as a beam emergence for the first interferometer and a beam emergence for the second interferometer.

7. The device according to claim 5, wherein the integrated optical component is arranged as a triple prism having a surface that is mirrored from place to place on an entry side, a beam component of one of the interferometers having separate beam paths being deflected by the triple prism via a beam entry and a beam emergence, a beam component of another one of the interferometers having beam paths lying one over the other being deflected at the mirrored surface.

8. The device according to claim 1, wherein at least one of (a) a manually and (b) a motor-driven linear drive is provided for shifting the movable optical components.

9. The device according to claim 1, wherein at least one of (a) a coupling of the beam into the interferometric measuring device, (b) an optical connection between the two interferometers, and (c) a relay of the emergent beams take place at least one of (a) using fiber optic guides and (b) as a free beam.

10. The device according to claim 1, wherein in both interferometers separately movable optical components are provided for adjusting the optical path differences between the beam components and coupling of motion of the optical components is carried out electronically via the uniform control of electrical drive elements.

11. The device according to claim 1, wherein the first interferometer is arranged as a modulation interferometer, and the second interferometer is arranged as at least one of (a) a reference interferometer, (b) a reference probe, and (c) a reference measuring point.

12. A method for balancing an optical path difference in an interferometric measuring device having two successive interferometers, comprising:

supplying short coherent radiation to the first interferometer via a radiation source which is split into two beam components via a first beam splitter, of which one beam component traverses a longer optical path length than the other beam component, to the effect that the optical path difference between the beam components is greater than a coherence length of the radiation; and before emerging from the first interferometer, recombining the two beam components and supplying the two beam components to the second interferometer, which splits the radiation into two additional beam components, optical path lengths of the two additional beam components being different to the effect that the optical path difference registered in the first interferometer is balanced again;

wherein the optical path differences between the beam components in the two interferometers are changed by mechanically coupled movable optical components simultaneously and by a same absolute amount.

13. The method according to claim 12, wherein the change of the optical path length in the two beam components takes place in at least one of (a) a same and (b) an opposite direction.

* * * * *